Feb. 7, 1961  H. W. TROLANDER  2,970,411
THERMISTOR STANDARDIZING
Filed July 1, 1958
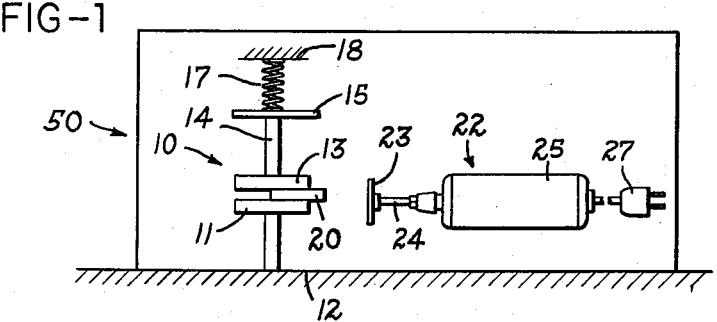
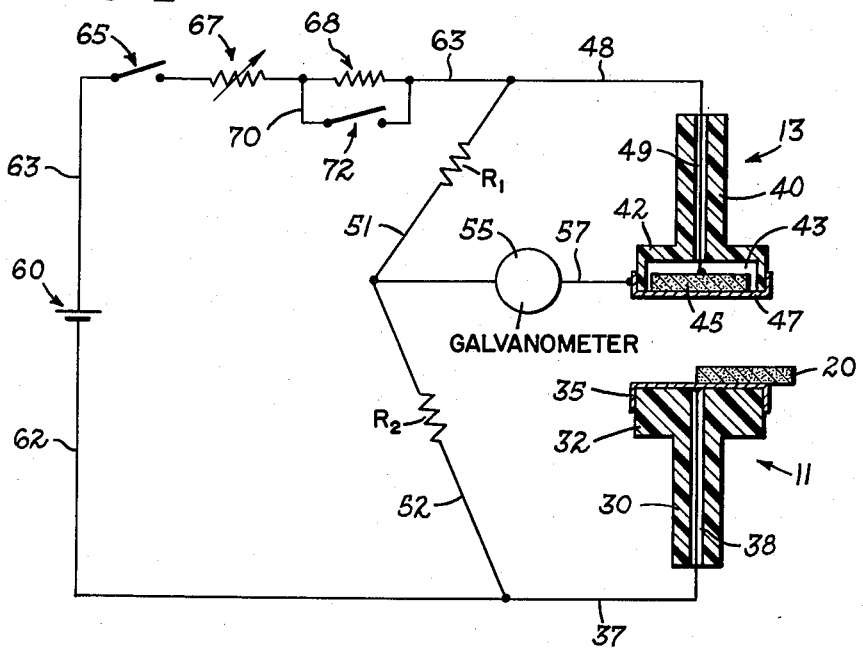
INVENTOR.
HARDY W. TROLANDER
BY
Marechal, Biebel, French & Bugg
ATTORNEYS

United States Patent Office

2,970,411
Patented Feb. 7, 1961

2,970,411

THERMISTOR STANDARDIZING

Hardy W. Trolander, Yellow Springs, Ohio, assignor to Yellow Springs Instrument Company, Yellow Springs, Ohio, a corporation of Ohio Filed July 1, 1958, Ser. No. 745,958

7 Claims. (Cl. 51—165)

This application relates to a process and apparatus for altering the resistance characteristic of thermally responsive electrical resistances, normally called thermistors, to permit close matching of the resistance characteristic of different thermistors.

Thermistors are thermally sensitive resistors made of semi-conducting materials whose resistance decreases about 4% per degree centigrade. They are useful in a variety of applications including temperature measurement and control. The semi-conducting materials used vary with the type of construction, one example being a combination of manganese oxide and nickel oxide, and they differ somewhat in resistance characteristic due to physical size and to differences in homogeneity of material.

The process by which thermistors are generally manufactured yields thermistors with a resistance tolerance in the order of ±10%, which is equivalent to a tolerance of ±2.5° C. when expressed in a resistance vs. temperature relationship. This relatively wide tolerance severely limits the application of thermistors to precise temperature measuring and controlling applications.

It is possible to improve the tolerance of thermistors so made by removing some of their material, as by grinding, filling, etc., to raise their resistance to a new value equal to or greater than the upper limit of their original tolerances. In such a manner a number of thermistors originally processed to a ±10% tolerance can be further processed to a new resistance value of closer tolerances. Since the desirable characteristic of thermistors is their extreme thermal sensitivity, the additional processing normally is a tedious procedure involving extremely close control of the temperature of the thermistor during the grinding and checking procedure, and therefore it is quite difficult to provide thermistors on a commercial basis which are all within a relatively close tolerance, permitting their use in highly sensitive temperature measuring and control systems.

The primary object of the invention is to provide a method wherein the non-standard thermistor has its resistance characteristic varied by reducing the physical size thereof while it is connected in an electrical bridge circuit and held in close thermal conductive relation with a standard thermistor of known thermal-electrical response characteristics, whereby the heating of the non-standard thermistor will result in substantially equal heating of the control or standard thermistor for effectively, for practical purposes, nullifying the effect of the heat generated during the grinding or other operation by which the size of the non-standard thermistor is reduced.

An additional object of this invention is to provide apparatus wherein non-standard thermistors may be clamped, one at a time, between opposing electrically conductive jaws of a suitable clamping member, and wherein one of these jaws supported a control thermistor in intimate thermal conducting relation with a member, preferably the electrical contact in that jaw, which in turn is in intimate thermal contact with the non-standard thermistor.

A further object of the invention is to provide such apparatus wherein the contacts are connected to provide one leg of a bridge circuit incorporating the non-standard thermistor, and wherein the control or standard thermistor is connected in an opposite leg of the bridge circuit, such that when the thermal characteristics of the non-standard thermistor approach those of the standard or control thermistor, the potential across the bridge circuit will approach zero, and an operator observing an indication of such potential can thus be informed as to when the grinding or other size reducing operation should cease.

Another object of the invention is to provide such apparatus in combination with an enclosure therefor which substantially precludes undesirable thermal effects on the thermistors during standardizing.

Other objects and advantages of the invention will be apparent from the following description, the accompanying drawing and the appended claims.

In the drawing:

Fig. 1 is a somewhat schematic view of apparatus in accordance with the invention, illustrating a thermistor clamped in position for operation thereon; and Fig. 2 is a schematic electrical diagram including a detail illustration, on an enlarged scale, of the jaws of the clamping device and associated control thermistor.

Referring to the drawing, which illustrates a preferred embodiment of the invention, in Fig. 1 the clamping member 10 includes a lower jaw 11 which is shown as fixed to a suitable supporting surface 12. The upper jaw 13 is carried on a stem 14 which includes a suitable handle, shown generally at 15, and a biasing spring 17 extends between a suitable stationary upper base 18 and handle 15 to bias jaws 11 and 13 normally to closed position. A non-standard thermistor 20 is shown clamped between jaws 11 and 13, preparatory for reduction of the physical size thereof by a suitable grinding tool 22, including a small grinding wheel 23 mounted on the shaft or arbor 24 of an electric motor 25, which in turn receives its power from a conventional plug connector 27 which may be connected to any suitable source of electricity. The grinder 22 may be mounted on a suitable slide or the like (not shown) or it may merely be hand held, the latter situation being assumed for purposes of the present explanation.

Referring to Fig. 2, the lower jaw 11 is formed of a piece of insulating material 30, for example a synthetic resin material known as Bakelite, which is generally T-shaped in cross section, to provide an enlarged clamping head 32. Over the surface or face portion of the clamping head there is press fitted a contact cup 35 which in turn is soldered or otherwise suitably secured to an electrical lead 37 extending through a central bore 38 in member 30.

The upper jaw 13 is also formed by a suitable member 40 of insulating material such as Bakelite, and the head portion 42 thereof includes a recess or cavity 43 within which is mounted a control or standard thermistor 45 having a known temperature-resistance characteristic. This thermistor is received in face to face intimate contact with the under surface of a covering cup 47 which also may provide the electrical contact for the upper cup. In practice the cups 35 and 47 have been formed of 0.005 inch thick stainless steel shim stock which provides the requisite high thermal conductivity required in this construction as to cup 47. A further electrical lead 48 extends through a bore 49 in the head member 40 and is secured, as by soldering, to control thermistor 45.

The above described apparatus preferably is contained within a housing, indicated generally at 50, which provides a confined atmosphere, substantially preventing drafts and/or other deleterious cooling or heating effects which might affect a standardizing operation.

Thus, the electrical path from contact member 47 through thermistor 45 and lead 48 may constitute one leg of a resistance Wheatstone bridge circuit, and the opposite leg is provided by the non-standard thermistor 20 which is received between the contact cups 35 and 47 when the jaws are closed, together with the lead 37. The other legs of the bridge circuit are provided by suitable resistances $R_1$ and $R_2$, of equal value, and connected in lines 51 and 52, respectively, as shown in the drawing.

A conventional galvanometer 55 is connected in line 57 which extends from the juncture of the legs incorporating the standard and non-standard thermistors, i.e., from cup 47, to the juncture of lines 51 and 52. Thus, with $R_1$ equal to $R_2$, when the resistance of thermistor 20 equals the resistance of thermistor 45 the galvanometer reading will be zero.

A suitable source of potential, shown as battery 60, is connected through lines 62 and 63 to the opposite corners of the bridge circuit, in the usual manner. Line 63 includes in series an on-off switch 65, a variable resistor 67 which may be adjusted manually to adjust the potential applied across the bridge circuit, and a further "ranging" resistor 68. A shunt circuit is provided around range resistor 68 by a line 70 which includes a manually operable switch 72. During initial checking operations, as the process of standardizing the thermistor 20 is begun, switch 72 may be opened to lower the potential applied across the bridge, since there will be a considerable unbalance between the resistance of the two thermistors, and since at this lower potential there will be less likelihood for effective resistance heating to occur. Then, as the point of balance is approached, switch 72 may be closed to increase the potential applied to the bridge circuit for the short time necessary to bring the thermistor 20 within the desired resistance range, i.e., until the galvanometer reads zero.

Thus, the present invention provides a method, and relatively simple and inexpensive apparatus by which such method may be performed, for improving the tolerance of resistance characteristic of thermistors to the point where such thermistors may be employed reliably in precise temperature measuring or controlling apparatus. The process may be carried out rather quickly, and thus is applicable to standardizing of large numbers of thermistors, with the result that processed thermistors having relatively close tolerance in resistance characteristic are obtained at minimum expense, yet with a substantial increase in their value.

While the method and form of apparatus herein described constitutes a preferred embodiment of the invention, it is to be understood that the invention is not limited to this precise method and form of apparatus, and that changes may be made therein without departing from the scope of the invention which is defined in the appended claims.

What is claimed is:

1. Apparatus for standardizing the thermal response characteristics of thermistors to close tolerances, comprising a clamping member including jaws having opposed face portions, means providing electrical contacts on said face portions, means mounting said jaws for movement toward each other to clamp a thermistor to be standardized therebetween, a standard thermistor mounted in one of said jaws, means forming a path of relatively high thermal conductivity and a path of electric conductivity between said standard thermistor and the face portion of said one jaw, means for reducing the physical size of a thermistor while it is clamped between said jaws with consequent heating of the thermistor, a comparative type electrical circuit connected to said contacts and to said standard thermistor including a source of electrical potential, and means in said circuit providing a visual indication of a balance in the resistance of said standard thermistor and the thermistor operated upon.

2. Apparatus for standardizing the thermal response characteristics of thermistors to close tolerances, comprising a clamping member including jaws having opposed face portions, electrical contacts on said face portions, one of said jaws having a cavity therein covered by the associated one contact, said one contact having a characteristically relatively high thermal conductivity, a standard thermistor mounted in said cavity in intimate thermally and electrically conductive contact with said one electrical contact, means mounting said jaws for movement toward each other to clamp a thermistor to be standardized therebetween, means for reducing the physical size of a thermistor while it is clamped between said jaws with consequent heating of the thermistor worked upon, said one contact providing a path of relatively high thermal conductivity between said standard thermistor and the thermistor being worked upon for substantially equalizing the thermal effects upon the two thermistors, an electrical bridge circuit including a source of electrical potential, means connecting said bridge circuit to said contacts and to said standard thermistor locating said standard thermistor and the thermistor clamped between said contacts in opposite legs of said bridge circuit, and means in said circuit providing a visual indication of a balance in the resistance of said standard thermistor and the thermistor operated upon.

3. Apparatus for standardizing the thermal response characteristics of thermistors to close tolerances, comprising a clamping member including jaws having opposed face portions, means providing electrical contacts on said face portions, means mounting said jaws for movement toward each other to clamp a non-standard thermistor therebetween, a standard thermistor mounted in one of said jaws in physical contact with the contact on said one jaw, means including the electrical contact on said jaw for forming a path of relatively high thermal conductivity between said standard thermistor and a non-standard thermistor held between said jaws grinding means for reducing the physical size of a non-standard thermistor while it is clamped between said jaws with resultant heating of the non-standard thermistor, and an electrical bridge circuit connected to said contacts and to said standard thermistor including a source of electrical potential and means providing a visual indication of a balance in the resistances of said standard thermistor and the non-standard thermistor operated upon.

4. Apparatus for standardizing the thermal response characteristics of thermistors to close tolerances, comprising a clamping member including jaws having opposed face portions, means providing electrical contacts on said face portions, means mounting said jaws for movement toward each other to clamp a thermistor to be standardized therebetween, a standard thermistor mounted in one of said jaws and electrically connected to the contact on said one jaw, means forming a path of relatively high thermal conductivity between said standard thermistor and the face portion of said one jaw, means for reducing the physical size of a thermistor while it is clamped between said jaws with consequent heating of the thermistor, a comparative type electrical circuit connected to said contacts and to said standard thermistor, including a source of electrical potential, means in said circuit providing an indication of a balance in the resistance of said standard thermistor and the thermistor operated upon, and means providing a housing enclosure for said jaws and said size reducing means to provide a confined atmosphere surrounding the thermistor to be standardized.

5. Apparatus for standardizing the thermal response characteristics of thermistors to close tolerances, comprising a clamping member including jaws having opposed face portions, means providing electrical contacts on said face portions, means mounting said jaws for movement toward each other to clamp a non-standard thermistor therebetween, a standard thermistor mounted in one of said jaws, means including the electrical contact on said jaw for forming a path of relatively high thermal and electrical conductivity between said standard thermistor and a non-standard thermistor held between said jaws, grinding means for reducing the physical size of a non-standard thermistor while it is clamped between said jaws with resultant heating of the non-standard thermistor, an electrical bridge circuit connected to said contacts and to said standard thermistor including a source of electrical potential and means providing a visual indication of a balance in the resistances of said standard thermistor and the non-standard thermistor operated upon, and enclosure means surrounding said jaws and said grinding means providing a substantially confined atmosphere surrounding the thermistor to be standardized.

6. Apparatus for standardizing the thermal response characteristics of thermistors to close tolerances, comprising means forming an electrical bridge circuit including a source of electrical potential, a standard thermistor of known thermal-electrical response characteristics connected into said bridge circuit, means for mounting a non-standard thermistor in close thermal conductive relation to said standard thermistor, electrical contacts cooperable with said mounting means to connect said non-standard thermistor into said bridge circuit in comparative relation to said standard thermistor, means in said circuit providing an indication of a balance in the resistance of said standard thermistor and the non-standard thermistor operated upon, and means for reducing the physical size of a non-standard thermistor while it is supported in said mounting means to provide substantially equal heating of said standard thermistor and the non-standard thermistor resulting from physical work performed on the non-standard thermistor.

7. Apparatus for processing thermistors to standardize the thermal response characteristics thereof to close tolerances, comprising means for mounting a non-standard thermistor to be operated upon including a control thermistor of standard thermal-electrical response characteristics arranged to be held in thermal conductive relation to the non-standard thermistor, means for reducing the physical size of the non-standard thermistor while it is in such close thermal conductive relation with said standard thermistor to equalize substantially the heating effects of the reducing operation and thus to nullify comparative changes in electrical resistance of the two thermistors due to temperature changes, and measuring means including said standard thermistor and contacts for connection to the non-standard thermistor operable to determine when the non-standard thermistor is changed to have thermal-electrical response characteristics corresponding to the standard thermistor.

References Cited in the file of this patent
UNITED STATES PATENTS

| | | |
|---|---|---|
| 2,370,609 | Wilson et al. | Feb. 27, 1945 |
| 2,609,644 | Brown et al. | Sept. 9, 1952 |